Feb. 24, 1959     J. H. ST. JOHN     2,875,402

TRACE BRIGHTENING CIRCUIT

Filed Nov. 9, 1956

INVENTOR
JOHN H. ST. JOHN

BY Semmes & Semmes

ATTORNEYS

United States Patent Office 2,875,402
Patented Feb. 24, 1959

2,875,402

TRACE BRIGHTENING CIRCUIT

John H. St. John, Bogota, N. J., assignor to Heyer Industries, Inc., Belleville, N. J., a corporation of Delaware Application November 9, 1956, Serial No. 621,389

10 Claims. (Cl. 324—16)

The present invention relates broadly to a circuit for use in cathode ray oscilloscope circuits for visual testing of internal combustion engines of the electrical ignition type.

More specifically, the present invention is designed for use in connection with electrical testing systems, and particularly those for testing and indicating the condition of multi-cylinder internal combustion engines of the electrical ignition type, utilizing an oscilloscopic display and measurement of the electrical performance of the various components of the system.

In testing systems of this nature a high degree of accuracy is required, but additionally, and of the utmost importance, there must be ease of reading depicted patterns. Known devices, including the cathode ray oscilloscope, are used today in analyzing engine performance. One such system which has been found to be effective is disclosed in my copending application, Serial No. 557,567, filed January 5, 1956.

It is an object of the present invention to provide an improvement in such a circuit which will give superior operation in permitting ease, accurateness and clarity of reading ionization voltage derived from a high tension or high voltage pickup from the ignition system. Ionization voltage may be defined as that high voltage required to ionize the combustible mixture in an internal combustion engine and to initiate the arc across the spark plug gap as opposed to the lower voltage which maintains the arc across the gap.

The present invention is particularly useful in oscillographic analysis to brighten the high frequency portions of recurring transient phenomena occurring around an internal combustion engine.

This invention is particularly suitable, as for example only, when displaying a secondary ignition pattern on a cathode ray tube to visually indicate in a clearer manner the ionization voltage in an electrical ignition system as derived from a high tension pickup applied to the ignition system. Under such circumstances the spikes or ionization lines of high voltage are of such short duration that cathode ray tubes displaying said lines appear very faint. If the brightness is increased to facilitate ease of reading, the cathode ray tube will normally bloom and defocus the low frequency portions of the pattern, and additionally the screen of the tube is damaged by long duration of repetitive waves. In short, the present system is selective in operation between low frequency and high frequency transient phenomena.

An additional object of the present invention is to provide an intensifier circuit for use in analyzing circuits of the type referred to, which will drive the cathode ray oscilloscope to maximum brightness for the high frequency portions of the pattern derived from the information pickup of the engine, and wherein said circuit may also serve to de-intensify or blank out other parts of the pattern, thus making high frequency portions of the pattern much brighter.

A further object of this invention is to provide in such a circuit an intensifier which can cause or be made to cause defocusing, thus rendering a wider depicted pattern of the high frequency portions of the pattern.

Yet another object of invention is to provide the average mechanic with novel portable means for clearly discerning and accurately measuring high frequency transient phenomena at the locus of the automotive engine, regardless of daylight or other adverse lighting conditions. This concept is adapted to give the average mechanic the electronic analysis skill hitherto reserved for the electronic technician sheltered under ideal laboratory conditions.

There are different manners of arriving at the ultimate ends sought and solved by the present invention. These include: (1) driving the grid of the cathode ray oscilloscope tube positive during the selected occurrence of the high frequency phenomena; (2) driving the cathode of the cathode ray oscilloscope tube negative during the selected occurrence of high frequency phenomena; and (3) a combination of the first and second methods. In any of these circumstances, the application of a positive voltage to the grid or a negative voltage to the cathode or a combination thereof, of sufficient amplitude, results in maximum instantaneous beam current and maximum brightness. Defocusing and/or blooming also occurs, causing such secondary voltages to have more easily discernible traces on the screen of the cathode ray oscilloscope tube. In the present instance, it is vertical height of the trace which concerns the operator and not the actual configuration of the transient information.

Other objects and advantages of the invention will be more readily apparent from the following detailed description of embodiments thereof, when taken together with the accompanying drawings, in which.

Figure 1:
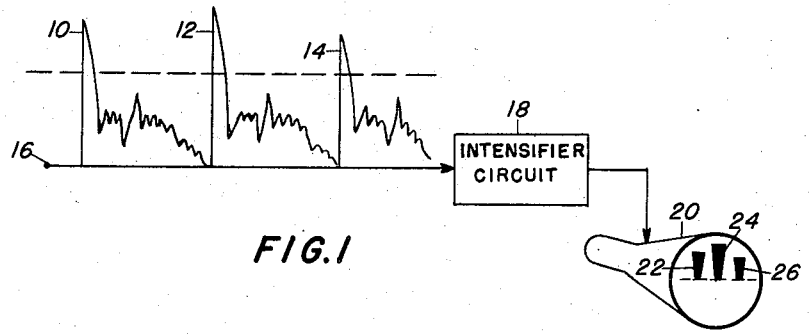
Fig. 1 is a diagrammatic sketch showing the present invention as broadly applied.

In the drawings and following description, only those portions of an overall circuit for visually analyzing the operation of an internal combustion engine are included which are necessary to understand the present invention. It is to be understood that the information to be imparted to the cathode ray oscilloscope tube in the nature of transient phenomena is derived from information pickup devices including transducers, voltage dividers, etc. The actual association of the invention with an internal combustion engine to be tested and features such as the triggering circuit are not included since unnecessary to an understanding of this invention. For details in this connection, however, reference can be made to my aforementioned copending patent application, Serial No. 557,567, which by reference is specifically incorporated herein.

In Figure 1 of the drawings a plurality of recurring transient phenomena lines or spikes are shown at 10, 12 and 14, derived through the circuit from the engine by means of information pickup devices through conductor 16. These high frequency peaks are passed through an intensifier circuit diagrammatically indicated at 18, and since this high frequency circuit is frequency selective, positive or negative pulses are applied to either the grid or the cathode of a cathode ray oscilloscope tube 20, as shown, and the resultant traces or wave forms are as depicted at 22, 24 and 26. It will be seen that in this application of the invention, the wave forms, through defocusing and blooming have much wider than normal traces, and more readily discernible presentations, the height of which can be more readily observed and measured even under adverse light conditions. The value of this resultant phenomena will be apparent to those skilled in the art, to mechanics and technicians whose duties call for analysis at the locus of the vehicle engine. This invention thus places a laboratory oscilloscope at the field level. It is also to be understood that the higher the voltage applied, the wider the pattern is at the top and hence the more easily readable it becomes. This increased width or spreading of the pattern at its top is due to the fact that voltage applied to the grid is directly proportional to the height of the pattern. The higher the pattern the greater is the amount of defocusing and the pattern will spread at its top while its base will be substantially unaffected.

Figure 2:
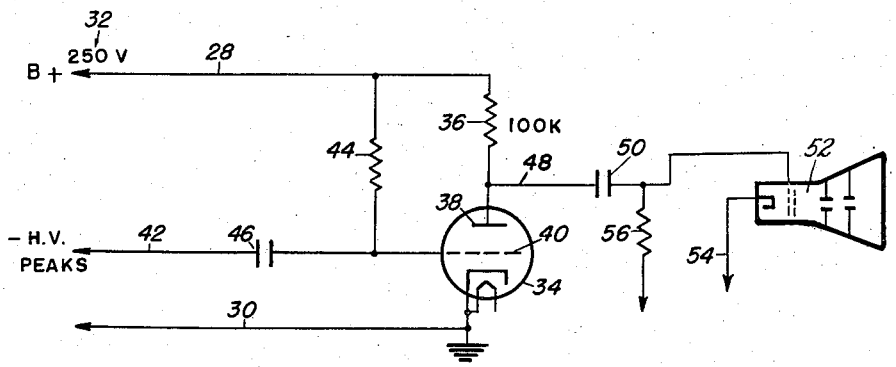
Fig. 2 is a diagrammatic or schematic view of one form of system in accordance with this invention.

The circuit shown in Figure 2 is one means of effecting the desired result in accordance with the present invention. Voltage leads in the overall circuit are indicated at 28 and 30 and conductor 28 being adapted to impress on the circuit a positive voltage in the nature of, for example, 250 volts as indicated at 32. Conductor 28 leads to tube 34 via 100 k. resistor 36 thence to plate 38 of the tube. Negative high frequency phenomena from the engine ignition system are impressed on the grid 40 of tube 34 through conductor 42. The tube 34 preferably consists, in the circuit, of one-half 12AU7 or 12AT7, or the equivalent, which is held strongly conducting by holding the grid 40 slightly positive by virtue of a 3.9 meg. resistor 44 interposed between conductors 28 and 42. A capacitor 46 of suitable value in conductor 42 differentiates high frequency phenomena of sufficient amplitude, derived from the engine, this being the same wave as ultimately applied to the vertical deflection plates, not shown, of the cathode ray oscilloscope tube. These high frequency phenomena are amplified and applied through conductor 48 with a 1,000 M. M. F. capacitor 50 to the grid 52 of a cathode ray oscilloscope tube.

Bias for the cathode ray oscilloscope tube is diagrammatically indicated at 54 as applied to the cathode of the tube. A 3.9 meg. resistor is also coupled to conductor 48 as at 56. In ignition analysis, capacitor 46 may be of an order which may be coupled to the input with negligible loading to obtain the desired results. The value of capacitor 46 for any application will naturally vary depending on the character of the transient phenomena to be observed and the amount of defocusing and brightening desired. By means of applying the so-effected high voltage negative spikes, the grid of the cathode ray oscilloscope tube is driven slightly positive on maximum peaks which accentuates the pattern depicted on the screen as discussed hereinbefore.

Manifestly, if desired, the same effect can be obtained by driving the cathode of the cathode ray oscilloscope tube negative during the period of depiction of the ionization lines.

Figures 3, 4:
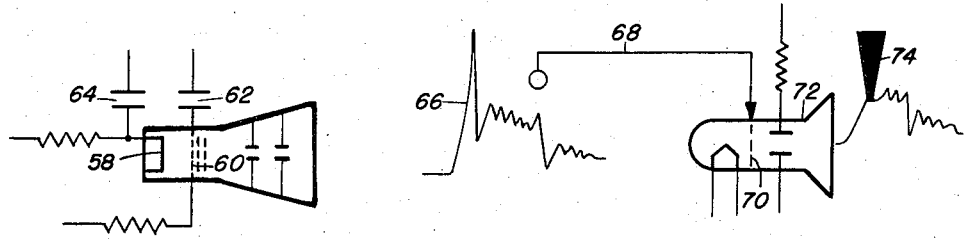
Fig. 3 is a diagrammatic sketch of a segment of a circuit utilizing the teachings of the present invention.
Fig. 4 is a composite diagrammatic sketch of the results of the present invention.

In Figure 3, a cathode 58 of a cathode ray oscilloscope tube is schematically shown as also is a grid 60. By application of a positive voltage to the grid 60 through capacitor 62 or a negative pulse to the cathode 58 through capacitor 64 (or a combination thereof), and of sufficient amplitude, there results increased instantaneous beam current and greater brightness.

The normal voltage from an auto ignition secondary appears for example as shown at 66. This can be differentiated through a small capacitor as indicated above and applied as indicated at 68 to the grid 70 of a cathode ray oscilloscope tube 72 to make this high voltage negative transient and its peak visible as shown at 74 with, of course, the blooming and defocusing. The voltage can also be applied through a small capacitor to the cathode of the cathode ray tube to give the same end result.

Manifestly, the overall circuit and the application of the present invention to circuits of different natures can be modified within the spirit and scope of the present invention without departing from the spirit and scope thereof as defined in the appended claims. The above system is equally well adapted to electromagnetic deflection cathode ray oscilloscopes.

I claim:

1. In combination with an internal combustion engine analyzer employing a cathode ray tube in which generated ignition signals derived from the ignition system are displayed, intensifier circuit adapted to render more visible under high ambient light conditions the normally faint trace displayed on the cathode ray tube screen for the duration of the high voltage spike portion of the ignition signal generated by the ignition system for the purpose of ionizing the spark plug gap, said circuit including frequency selective means offering low impedance to the high voltage spike portion and high impedance to other portions of the ignition signal, said other portions of the ignition signal being substantially unaffected whereby the selected portion of the ignition signal is applied to the cathode ray tube for exaggerated display thereof.

2. The combination according to claim 1 in which the intensifier circuit is interconnected to the grid of the cathode ray tube driving it more positive on maximum ionization peaks, the intensifier circuit including a vacuum tube for polarity reversal.

3. The combination of claim 2 in which the vacuum tube is a triode.

4. The combination according to claim 1 in which the intensifier circuit is interconnected to the cathode of the cathode ray tube driving it more negative on maximum ionization peaks.

5. The combination according to claim 1 in which the intensifier circuit is interconnected to the cathode of the cathode ray tube and through polarity reversing means to the grid of the cathode ray tube rendering grid and cathode thereof respectively more positive and negative on maximum ionization peaks.

6. The combination according to claim 5 in which the vacuum tube is a triode vacuum tube.

7. The combination according to claim 1 in which the frequency selective means is a capacitive reactor.

8. The combination according to claim 7 in which the intensifier circuit is interconnected through polarity reversing means to the grid of the cathode ray tube driving it more positive on maximum ionization peaks.

9. The combination according to claim 7 in which the intensifier circuit is interconnected to the cathode of the cathode ray tube driving it more negative on maximum ionization peaks.

10. The combination according to claim 7 in which the intensifier circuit is interconnected through polarity reversing means to the grid of the cathode ray tube and directly to the cathode of the cathode ray tube driving both grid and cathode respectively more positive and negative on maximum ionization peaks.

References Cited in the file of this patent
UNITED STATES PATENTS

| | | |
|---|---|---|
| 2,355,363 | Christaldi | Aug. 8, 1944 |
| 2,787,726 | Benoit | Apr. 2, 1957 |
| 2,831,161 | Blaha et al. | Apr. 15, 1958 |